United States Patent Office 3,753,912
Patented Aug. 21, 1973

3,753,912
FUNCTIONAL FLUIDS CONTAINING MORPHOLINE-INITIATED POLYGLYCOL CORROSION INHIBITORS

Robert J. Nankee and Robert Carswell, Midland, Mich., assignors to The Dow Chemical Company, Midland, Mich.
No Drawing. Continuation of abandoned application Ser. No. 829,790, June 2, 1969. This application Oct. 7, 1971, Ser. No. 187,534
Int. Cl. C09k 3/02
U.S. Cl. 252—77       5 Claims

ABSTRACT OF THE DISCLOSURE

The invention is novel functional fluids containing a small but effective amount of morpholine-initiated polyglycol to inhibit corrosion of metals in contact with such functional fluids.

CROSS-REFERENCE TO RELATED APPLICATION

This application is a continuation of our copending application Ser. No. 829,790, filed June 2, 1969, now abandoned.

BACKGROUND OF THE INVENTION

Metals in contact with functional fluids corrode in the absence of a corrosion inhibitor. A number of corrosion inhibitors are known for conventional functional fluids based on glycol monoethers, but finding an effective corrosion inhibitor has been especially difficult for fluids having a lower affinity for water than the conventional fluids. Corrosion inhibitors generally used for the conventional functional fluids are not effective in the low hygroscopic fluids for various reasons. The majority of the corrosion inhibitors used in the conventional functional fluids are not compatible with the low hygroscopic fluids and others do not provide adequate protection.

SUMMARY OF THE INVENTION

According to the present invention, new and effective corrosion inhibitors have now been found for both low hygroscopic and conventional functional fluids. The invention relates to functional fluids containing a small but effective amount of a morpholine-initiated polyglycol to inhibit corrosion of metals in contact with such functional fluids.

The term "functional fluid" as described herein encompasses polyglycols, polyglycol ethers, polyglycol esters, cyclic alkylene carbonates, alkyl carbonates and bisglycol ether carbonates defined as those compounds having the general formula

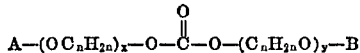

wherein

A, B=alkyl of 1–4 carbon atoms
$n=2$ or $3$
$x, y=$integers of 1 to 4.

Any of the polyglycol compounds may have an average molecular weight of about 100 to about 3000, whereas the carbonates may have a molecular weight of about 88 to about 500.

These functional fluids are divided into two groups according to the number of free hydroxyl radicals in the fluid. Those fluids having a substantial concentration of hydroxyl radicals such as polyglycols, polyglycol monoethers and polyglycol monoesters, are the conventional fluids. The fluids having a lower concentration of hydroxyl radicals such as polyglycol diethers, polyglycol diesters, polyglycol ether esters, cyclic alkylene carbonates, dialkyl carbonates and bisglycol ether carbonates, are considered to be low hygroscopic fluids.

Representative examples of the functional fluids of the invention, or components of such fluids, include: polyglycols such as polyethylene glycol, polypropylene glycol and polybutylene glycol; polyglycol ethers such as the methyl, ethyl, propyl or butyl mono and diethers of polyethylene glycol, polypropylene glycol or polybutylene glycol; mono and diesters of polyglycol such as the esters formed by reacting acetic acid, propionic acid or butyric acid with the terminal hydroxyls of polyethylene glycol, polypropylene glycol or polybutylene glycol; cyclic alkylene carbonates such as cyclic ethylene carbonate, cyclic 1,2- or 1,3-propylene carbonate, cyclic 1,2-, 1,3-, 2,3- and 1,4-butylene carbonate; alkylated carbonates such as diethyl carbonate, dipropyl carbonate, ethyl propyl carbonate or dibutyl carbonate; and bisglycol ether carbonates such as bis[2-(2-methoxyethoxy)ethyl]carbonate,
bis(2-methoxyethyl)carbonate,
bis[2-(2-ethoxy-ethoxy)ethyl]carbonate,
[2-(2-methoxyethoxy)ethyl][2-(2-methoxyethoxy)ethyl]carbonate,
[2-methoxyethyl][2-(2-methoxyethoxy)ethyl]carbonate and
bis(2-propoxy)propyl carbonate.

The polyglycols, polyglycol ethers, polyglycol esters, cyclic alkylene carbonates and alkyl carbonates are well known and readily available. The glycol ether carbonates may be prepared by reacting the appropriate glycol monoether with phosgene or by transesterification reacting a dialkyl carbonate with the appropriate glycol monoether.

The fluid of the invention may be any of the functional fluids described above or combination thereof containing a small but effective amount of a morpholine-initiated polyglycol. The preferred fluids of the invention contain a major amount of polyglycol ethers, polyglycol esters, cyclic alkylene carbonates, dialkyl carbonates and bisglycol ether carbonates. Those fluids containing a major amount of polyglycol diester or bisglycol ether carbonate are especially preferred.

The morpholine-initiated polyglycol of the invention has the general formula

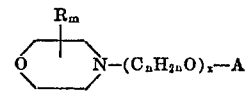

wherein
R=lower alkyl
$m=0–2$
$n=2–4$
$x=5–48$
A=H, alkyl of 1–10 carbon atoms or acyl of 1–10 carbon atoms These copolymers are prepared by reacting morpholine or a lower alkylated morpholine with the desired alkylene oxide in the presence of a strong base catalyst according to conventional base catalyzed oxyalkylation procedure. Generally the morpholine and a strong base catalyst are mixed together in the reaction chamber and the desired alkylene oxides are added separately or as the mixed oxides to form either a block or hetero polymer. The terminal hydroxyl radical of the polymer may optionally be etherified or esterified. The preferred morpholine-initiated polyglycols are block polymers containing morpholine or 2,6-dimethyl-morpholine, 12–16 propyleneoxy units and 2–6 ethyleneoxy units.

The morpholine-initiated polyglycol may be present in the functional fluid in any effective amount compatible with the functional fluid. Suitably the concentration of the morpholine-initiated polyglycol ranges from 0.1 to about 10 percent or more with 0.5 to 4 percent being preferred.

A surprising feature of the present invention is that a single compound which is compatible with low hygroscopic fluids and which is an effective corrosion inhibitor has been found. As a general rule, the functional fluids prior to this discovery have been inhibited by a package of three or more corrosion inhibitors.

SPECIFIC EMBODIMENTS

Example 1

To a clean, dry pressure vessel, 21.75 pounds of morpholine and .66 pounds of flaked sodium hydroxide were charged and mixed. The reaction vessel was evacuated, flushed with nitrogen, heated to 100° C. under 25 p.s.i.g. of nitrogen and maintained under these conditions for ½ hour. To the vessel, 203.25 pounds of propylene oxide was then added while maintaining the reactor at 108–113° C. and a pressure of 65 p.s.i.g. The propylene oxide was reacted until the pressure remained constant for 1 hour. Then, at 108° to 113° C., 38.56 pounds of ethylene oxide was added at a pressure of 65 p.s.i.g. The ethylene oxide was reacted until the pressure remained constant for 1 hour. After the reaction of the ethylene oxide, the vessel was cooled to 40° C. and the pressure was lowered to 15 mm. of Hg absolute to distill lower boiling compounds. The reaction vessel was opened and 30 pounds of water was added to the contents. Under a slight nitrogen purge at room temperature, the reaction products were neutralized by adding 85 percent phosphoric acid unitl a sample of reaction mixture diluted with an equal volume of a mixture of 9% water in methanol had a pH of 7.8. When the pH was constant, the reaction mixture was devolatilized at 120° C. and less than 20 mm. of Hg absolute for 1 hour. After the devolatilization, the reactor was cooled to below 30° and the pressure was released. At room temperature, the reaction product was filtered in a Sparkler filter using a diatomaceous earth filter aid to obtain a clear, colorless product. The reaction product recovered weighed 250 pounds and had an average molecular weight of 1050.

EXAMPLES 2–4

In the same manner as described in Example 1, other morpholine-initiated polyglycol corrosion inhibitors were prepared. The reaction conditions and properties of these inhibitors are recorded in Table I along with comparable data for Example 1.

EXAMPLE 5

The effectiveness of the morpholine-initiated polyglycol in Fluid A, 100% acetate-propionate diester of triethylene glycol; Fluid B, 90 percent by weight bis[2-(2-methoxyethoxy)ethyl]carbonate and 10 percent of polypropylene glycol having an average molecular weight of 2000; and Fluid C, 83 percent by weight bis[2-(2-methoxyethoxy)ethyl]carbonate and 17 percent of polypropylene glycol having an average molecular weight of 1200 was determined. These fluids were tested according to the standard corrosioin requirement for functional fluids set forth in SAE J1703. After the fluid was tested, 3 percent by weight of the morpholine-initiated polyglycol of Example 1 was added to a sample of each fluid and the tests were run again. The improvement in corrosion protection by the addition of the morpholine inhibitor compared to the pure fluid is shown in Table II.

TABLE II.—CORROSION TEST RESULTS ACCORDING TO THE SAE J1703 REQUIREMENTS SHOWING EFFECTIVENESS OF MORPHOLINE-INITIATED POLYGLYCOL CORROSION INHIBITOR

| SAE J1703 Test | Uninhibited Fluid A | Fluid A with 3% of Ex. 1 | Uninhibited Fluid B | Fluid B with 3% of Ex. 1 | Uninhibited Fluid C | Fluid C with 3% of Ex. 1 |
|---|---|---|---|---|---|---|
| Weight loss of metal strips | OK, pass | OK, pass | OK, pass | OK, pass | OK, pass | OK, pass. |
| Pitting or roughening of metal strips | Fail | OK, none | Fail | OK, none | Stained | OK, none. |
| Final pH | Fail | OK, 7.2 | Fail | OK, 7.2 | Fail | OK, 7.1. |

In a similar manner as shown in Example 1, other morpholine-initiated polyglycols may be prepared, for example, a 4-propylmorpholine-initiated block polymer having 7 ethyleneoxy units and 20 propyleneoxy units; a morpholine-initiated block polymer having 5 ethyleneoxy units, 4 propyleneoxy units and 7 butyleneoxy units; and a morpholine-initiated hetero polymer having 9 ethyleneoxy units and 5 butyleneoxy units.

In the same manner as described in Example 5, 4 percent by weight of the morpholine-initiated corrosion inhibitors described above may be added to Fluids A, B and C of Example 5 to protect metals in contact with the fluids from corrosion.

In a similar manner, 0.1 to 5 percent by weight of any of the morpholine-initiated corrosion inhibitors described above may be used in a functional fluid consisting essentally of cyclic ethylene carbonate, diethyl carbonate or diethyl ether of tripropylene glycol. The inhibited fluids protect metals in contact with the functional fluids from corrosion similar to the results shown in Example 5.

What is claimed is:

1. A functional fluid consisting essentially of a member selected from the group consisting of a poly-(lower alkylene) glycol and the lower mono- and dialkyl ethers and esters thereof, cyclic lower alkylene carbonate, di-(lower alkyl) carbonate, bisglycol ether carbonate having the formula

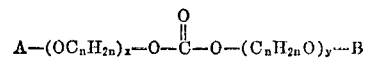

TABLE I.—REACTION CONDITIONS AND PROPERTIES OF MORPHOLINE-ALKYLENE OXIDE BLOCK POLYMERS

| | Example | | | |
|---|---|---|---|---|
| Initiator | 1 | 2 | 3 | 4 |
| | Morpholine | Morpholine | Morpholine | 2,6-dimethylmorpholine |
| PO/morpholine, mole ratio | 14.0 | 3.1 | 13.0 | 14.0 |
| EO/morpholine, mole ratio | 3.5 | 12.4 | 3.0 | 3.5 |
| Order of addition | 14 PO | 4.1 EO | 13 PO | 14 PO |
| Do | 3.5 EO | 3.1 PO | 3 EO | 3.5 EO |
| Do | | 8.3 EO | | |
| Average molecular weight of product | 1,050 | 800 | 950 | 1,080 |
| Reaction temperature, ° C | 108–113 | 100–110 | 138–145 | 100–110 |
| Product viscosity, c.s.: | | | | |
| 0° F.[1] | 7,200 | | 5,900 | 8,000 |
| 100° F | 82.2 | 62.5 | 70.0 | 76.6 |
| 210° F | 12.6 | 10.2 | 10.9 | 11.7 |
| Pour point, ° F | −40 | −35 | −39 | |
| Flash point (open cup), ° F | 525 | 440 | 550 | |
| pH | 7.8 | 7.6 | 7.1 | |

[1] Centipoises via cold stroking test.

wherein A and B are alkyl groups of 1–4 carbon atoms, each $n$ is an integer 2–3 and $x$ and $y$ are integers 1–4 or mixtures thereof and containing as a corrosion inhibitor a small but effective amount of a morpholine-initiated polyglycol which is a block polymer of one unit of morpholine or 2,6-dimethylmorpholine, about 3 to 16 propyleneoxy units and 2 to about 12 ethyleneoxy units.

2. The functional fluid of claim 1 wherein the morpholine-initiated polyglycol is a block polymer containing morpholine or 2,6-dimethylmorpholine, 12–16 propyleneoxy units and 2–6 ethyleneoxy units.

3. The functional fluid of claim 1 containing 0.1 to 10 percent by weight of the morpholine-initiated polyglycol.

4. The functional fluid of claim 1 containing 0.5 to 4 percent by weight of the morpholine-initiated polyglycol.

5. The functional fluid of claim 1 containing a major amount of polyglycol diester or bisglycol ether carbonate.

References Cited
UNITED STATES PATENTS

| | | | |
|---|---|---|---|
| 2,695,270 | 11/1954 | Jefferson et al. | 252—51.5 R X |
| 3,203,955 | 8/1965 | Jackson et al. | 260—247.7 |
| 3,268,447 | 8/1966 | Dickey et al. | 252—51.5 R X |
| 3,304,287 | 2/1967 | Kiss | 260—247.7 X |
| 3,334,048 | 8/1967 | Hitchcock et al. | 252—77 X |
| 3,377,288 | 4/1968 | Sawyer | 252—77 X |
| 3,420,828 | 1/1969 | Muhlbauer | 260—247.7 |

LEON D. ROSDOL, Primary Examiner

H. A. PITLICK, Assistant Examiner

U.S. Cl. X.R.

252—51.5 R, 79, 392; 260—247.7 A, 247.7 K